US010956889B2

(12) United States Patent
Maddocks et al.

(10) Patent No.: US 10,956,889 B2
(45) Date of Patent: Mar. 23, 2021

(54) METHOD AND SYSTEM FOR CONTACTLESS PAYMENT VIA QUICK RESPONSE CODE

(71) Applicant: MASTERCARD INTERNATIONAL INCORPORATED, Purchase, NY (US)

(72) Inventors: Ian David Alan Maddocks, Milton Keynes (GB); Harjender Singh, Singapore (SG)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 300 days.

(21) Appl. No.: 15/956,268

(22) Filed: Apr. 18, 2018

(65) Prior Publication Data
US 2019/0325415 A1 Oct. 24, 2019

(51) Int. Cl.
*G06Q 20/32* (2012.01)
*G06Q 20/20* (2012.01)
*G06Q 20/40* (2012.01)
*G06Q 20/38* (2012.01)

(52) U.S. Cl.
CPC ....... *G06Q 20/204* (2013.01); *G06Q 20/3278* (2013.01); *G06Q 20/3821* (2013.01); *G06Q 20/405* (2013.01)

(58) Field of Classification Search
CPC ........... G06Q 20/38; G06Q 20/32; H04B 5/00
See application file for complete search history.

(56) References Cited

U.S. PATENT DOCUMENTS

| 6,179,206 | B1 * | 1/2001 | Matsumori | G06Q 20/343 |
| | | | | 235/375 |
| 9,129,281 | B2 * | 9/2015 | Perry | G06Q 20/3224 |
| 9,947,002 | B2 * | 4/2018 | Toomer | G06Q 20/20 |
| 9,953,311 | B2 * | 4/2018 | Flurscheim | G06Q 20/3276 |
| 10,103,781 | B2 * | 10/2018 | Bellenger | H04W 4/80 |
| 10,242,326 | B2 * | 3/2019 | Arthur | G06Q 20/363 |
| 10,269,014 | B2 * | 4/2019 | Perry | G06Q 20/40 |

(Continued)

OTHER PUBLICATIONS

U.S. Appl. No. 15/793,237, entitled "Method and System for Conveyance of Machine Readable Code Data via Payment Network," filed Oct. 25, 2017.

(Continued)

*Primary Examiner* — Oluseye Iwarere
(74) *Attorney, Agent, or Firm* — Buchanan Ingersoll & Rooney PC (57) ABSTRACT

A method for contactless conveyance of transactional data includes: displaying, on a display device interfaced with a computing device, a machine-readable code, wherein the machine-readable code is encoded with transaction data; receiving, by a receiver of the computing device, a trigger notification; generating, by the computing device, a contactless data message, wherein the contactless data message is formatted according to one or more standards and includes at least the transaction data formatted according to the one or more standards; and electronically transmitting, by a transmitter of the computing device, the generated contactless data message to a point of sale device using a contactless communication protocol.

20 Claims, 5 Drawing Sheets

(56) References Cited

U.S. PATENT DOCUMENTS

| | | | | |
|---|---|---|---|---|
| 2004/0222302 A1* | 11/2004 | Matsumori | G06K 7/10851 | 235/472.01 |
| 2008/0222048 A1* | 9/2008 | Higgins | G06Q 20/4012 | 705/67 |
| 2009/0210308 A1* | 8/2009 | Toomer | G06Q 20/3223 | 705/16 |
| 2010/0082151 A1* | 4/2010 | Young | G06Q 10/08 | 700/226 |
| 2012/0232981 A1* | 9/2012 | Torossian | G06Q 30/06 | 705/14.27 |
| 2012/0317628 A1* | 12/2012 | Yeager | G06Q 20/204 | 726/5 |
| 2013/0110656 A1* | 5/2013 | Chau | G06Q 20/204 | 705/17 |
| 2013/0144731 A1* | 6/2013 | Baldwin | G06Q 20/204 | 705/17 |
| 2013/0203444 A1* | 8/2013 | Perry | C08G 18/72 | 455/456.3 |
| 2014/0040052 A1* | 2/2014 | Arthur | G06Q 20/12 | 705/16 |
| 2014/0100975 A1* | 4/2014 | Van | G06Q 20/40 | 705/21 |
| 2014/0279546 A1* | 9/2014 | Poole | G06Q 20/3227 | 705/44 |
| 2015/0014413 A1 | 1/2015 | Priebatsch | | |
| 2015/0088674 A1* | 3/2015 | Flurscheim | G06Q 20/3274 | 705/17 |
| 2015/0097028 A1* | 4/2015 | Bakker | G06Q 20/204 | 235/379 |
| 2015/0178724 A1* | 6/2015 | Ngo | G06Q 20/327 | 705/71 |
| 2015/0206128 A1* | 7/2015 | Torossian | G06Q 20/327 | 705/21 |
| 2015/0278799 A1* | 10/2015 | Palanisamy | G06Q 20/3821 | 705/76 |
| 2015/0332265 A1* | 11/2015 | Perry | C08G 18/72 | 705/44 |
| 2015/0339652 A1 | 11/2015 | Park et al. | | |
| 2015/0348024 A1* | 12/2015 | Asokan | G06Q 20/3552 | 705/76 |
| 2016/0104155 A1* | 4/2016 | McGaugh | G06Q 20/3821 | 705/65 |
| 2016/0210613 A1 | 7/2016 | McGill | | |
| 2016/0248479 A1* | 8/2016 | Bellenger | H04W 4/80 | |
| 2017/0076274 A1* | 3/2017 | Royyuru | G06Q 20/20 | |
| 2017/0221054 A1* | 8/2017 | Flurscheim | G06Q 20/3276 | |
| 2017/0278104 A1* | 9/2017 | O'Connell | G06Q 20/4014 | |
| 2017/0352021 A1* | 12/2017 | Szeto | G06Q 20/3223 | |
| 2018/0089668 A1* | 3/2018 | Wong | G06Q 30/0613 | |
| 2018/0189786 A1* | 7/2018 | Poole | G06Q 10/087 | |
| 2018/0204206 A1* | 7/2018 | Flurscheim | G06K 19/06037 | |
| 2018/0253726 A1* | 9/2018 | Kumnick | G06Q 20/4016 | |
| 2018/0268392 A1* | 9/2018 | Arthur | G06Q 20/227 | |
| 2018/0268403 A1* | 9/2018 | Guglani | G06Q 20/38215 | |
| 2018/0276645 A1* | 9/2018 | Toomer | G06Q 20/3223 | |
| 2019/0188607 A1* | 6/2019 | Arthur | G06Q 20/363 | |

OTHER PUBLICATIONS

U.S. Appl. No. 15/878,571, entitled "Method and System for Barcode Enabled Payments," filed Jan. 24, 2018.

Notification of Transmittal of the International Search Report and the Written Opinion of the International Searching Authority (Forms PCT/ISA/220, PCT/ISA/210 and PCT/ISA/237) dated May 28, 2019, by the Japan Patent Office in corresponding International Application No. PCT/US2019/019558. (8 pages).

* cited by examiner

METHOD AND SYSTEM FOR CONTACTLESS PAYMENT VIA QUICK RESPONSE CODE

FIELD

The present disclosure relates to the contactless conveyance of transaction data, specifically the conversion of one-time numbers and other alternative payment mechanisms from displayed machine-readable codes to formats suitable for electronic transmission, such as through near field communication.

BACKGROUND

With the increasing prevalence of computing devices, many methods have been developed to enable a computing device to be used to fund an electronic payment transaction. Originally, a user could manually input payment details into their computing device, which would be transmitted for processing in the payment transaction, such as via a web page or other similar application program. As technology became more advanced, electronic wallets were developed, which were specialized application programs that utilized more secure methods of storage to store payment credentials, which could be electronically transmitted to a merchant point of sale through a network (e.g., the Internet) or even directly, such as via near field communication for an in-purchase transaction. Traditionally, electronic wallets have operated by storing all of the same data that would be stored in a payment card and conveying it to a point of sale, where the point of sale receives the same data that it would if reading the payment card directly, effectively trading a payment card for a mobile device that acts as a payment card.

In more recent times, some entities have developed their own kinds of electronic wallets, such as Alipay® that use alternative methods to pay for payment transactions. In such wallets, the wallet may generate unique data that is provided to the merchant, where the merchant routes that data back to the provider of the wallet or an associated financial institution that can identify a related, pre-funded, cash balance account to be used to fund the transaction. Such methods provide for greater security than standard electronic wallets, as the unique data may be usable for only a single transaction, and may only be processed through merchants that are configured to receive and use such data, where the provider of the wallet acts as a payment service provider for the transaction. One common type of unique data is a one-time number.

Many electronic wallets and other application programs are configured to convey one-time numbers or other similar types of payment credentials by means of a machine-readable code, such as a quick response (QR) code. In many cases, the electronic wallet or application program is unable to convey the payment credentials using any other mechanism. At the same time, many point of sale devices may not be configured to read machine-readable codes, such as due to a lack of proper application programs or a lack of an image capture device suitable for reading the machine-readable code. Thus, there is a need for a technological improvement to computing devices to enable payment credentials in these cases to be conveyed by alternative means that can be adequately read and received by all types of point of sale devices.

SUMMARY

The present disclosure provides a description of systems and methods for contactless conveyance of transactional data. Payment credentials or other transactional data, such as alternative type of credentials encompassed in a one-time number, that is normally conveyed in a displayed machine-readable code may be converted, such as by an alternative program in a computing device, into a format suitable for electronic transmission using a contactless communication method. This contactless data message is then conveyed to a point of sale device using the contactless communication method, enabling the data, typically reserved for conveyance only through a machine-readable code, to be read and received by point of sale devices that cannot read machine-readable codes, and to also expand the potential acceptance of the underlying credentials.

A method for contactless conveyance of transactional data includes: displaying, on a display device interfaced with a computing device, a machine-readable code, wherein the machine-readable code is encoded with transaction data; receiving, by a receiver of the computing device, a trigger notification; generating, by the computing device, a contactless data message, wherein the contactless data message is formatted according to one or more standards and includes at least the transaction data formatted according to the one or more standards; and electronically transmitting, by a transmitter of the computing device, the generated contactless data message to a point of sale device using a contactless communication protocol.

A system for contactless conveyance of transactional data includes: a display device interfaced with a computing device configured to display a machine-readable code, wherein the machine-readable code is encoded with transaction data; a receiver of the computing device configured to receive a trigger notification; the computing device configured to generate a contactless data message, wherein the contactless data message is formatted according to one or more standards and includes at least the transaction data formatted according to the one or more standards; and a transmitter of the computing device configured to electronically transmit the generated contactless data message to a point of sale device using a contactless communication protocol.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes for thousands, millions, and even billions of transactions during a given period. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, transaction accounts, etc. Examples of networks or systems configured to perform as payment networks include those operated by MasterCard®, VISA®, Discover®, American Express®, PayPal®, etc. Use of the term "payment network" herein may refer to both the payment network as an entity, and the physical payment network, such as the equipment, hardware, and software comprising the payment network.

Transaction Account—A financial account that may be used to fund a transaction, such as a checking account, savings account, credit account, virtual payment account, etc. A transaction account may be associated with a consumer, which may be any suitable type of entity associated with a payment account, which may include a person, family, company, corporation, governmental entity, etc. In some instances, a transaction account may be virtual, such as those accounts operated by PayPal®, etc.

Payment Rails—Infrastructure associated with a payment network used in the processing of payment transactions and the communication of transaction messages and other similar data between the payment network and other entities interconnected with the payment network that handles thousands, millions, and even billions of transactions during a given period. The payment rails may be comprised of the hardware used to establish the payment network and the interconnections between the payment network and other associated entities, such as financial institutions, gateway processors, etc. In some instances, payment rails may also be affected by software, such as via special programming of the communication hardware and devices that comprise the payment rails. For example, the payment rails may include specifically configured computing devices that are specially configured for the routing of transaction messages, which may be specially formatted data messages that are electronically transmitted via the payment rails, as discussed in more detail below.

Merchant—An entity that provides products (e.g., goods and/or services) for purchase by another entity, such as a consumer or another merchant. A merchant may be a consumer, a retailer, a wholesaler, a manufacturer, or any other type of entity that may provide products for purchase as will be apparent to persons having skill in the relevant art. In some instances, a merchant may have special knowledge in the goods and/or services provided for purchase. In other instances, a merchant may not have or require any special knowledge in offered products. In some embodiments, an entity involved in a single transaction may be considered a merchant. In some instances, as used herein, the term "merchant" may refer to an apparatus or device of a merchant entity.

Issuer—An entity that establishes (e.g., opens) a letter or line of credit in favor of a beneficiary, and honors drafts drawn by the beneficiary against the amount specified in the letter or line of credit. In many instances, the issuer may be a bank or other financial institution authorized to open lines of credit. In some instances, any entity that may extend a line of credit to a beneficiary may be considered an issuer. The line of credit opened by the issuer may be represented in the form of a payment account, and may be drawn on by the beneficiary via the use of a payment card. An issuer may also offer additional types of payment accounts to consumers as will be apparent to persons having skill in the relevant art, such as debit accounts, prepaid accounts, electronic wallet accounts, savings accounts, checking accounts, etc., and may provide consumers with physical or non-physical means for accessing and/or utilizing such an account, such as debit cards, prepaid cards, automated teller machine cards, electronic wallets, checks, etc.

Acquirer—An entity that may process payment card transactions on behalf of a merchant. The acquirer may be a bank or other financial institution authorized to process payment card transactions on a merchant's behalf. In many instances, the acquirer may open a line of credit with the merchant acting as a beneficiary. The acquirer may exchange funds with an issuer in instances where a consumer, which may be a beneficiary to a line of credit offered by the issuer, transacts via a payment card with a merchant that is represented by the acquirer.

Payment Transaction—A transaction between two entities in which money or other financial benefit is exchanged from one entity to the other. The payment transaction may be a transfer of funds, for the purchase of goods or services, for the repayment of debt, or for any other exchange of financial benefit as will be apparent to persons having skill in the relevant art. In some instances, payment transaction may refer to transactions funded via a payment card and/or payment account, such as credit card transactions. Such payment transactions may be processed via an issuer, payment network, and acquirer. The process for processing such a payment transaction may include at least one of authorization, batching, clearing, settlement, and funding. Authorization may include the furnishing of payment details by the consumer to a merchant, the submitting of transaction details (e.g., including the payment details) from the merchant to their acquirer, and the verification of payment details with the issuer of the consumer's payment account used to fund the transaction. Batching may refer to the storing of an authorized transaction in a batch with other authorized transactions for distribution to an acquirer. Clearing may include the sending of batched transactions from the acquirer to a payment network for processing. Settlement may include the debiting of the issuer by the payment network for transactions involving beneficiaries of the issuer. In some instances, the issuer may pay the acquirer via the payment network. In other instances, the issuer may pay the acquirer directly. Funding may include payment to the merchant from the acquirer for the payment transactions that have been cleared and settled. It will be apparent to persons having skill in the relevant art that the order and/or categorization of the steps discussed above performed as part of payment transaction processing.

Point of Sale—A computing device or computing system configured to receive interaction with a user (e.g., a consumer, employee, etc.) for entering in transaction data, payment data, and/or other suitable types of data for the purchase of and/or payment for goods and/or services. The point of sale may be a physical device (e.g., a cash register, kiosk, desktop computer, smart phone, tablet computer, etc.) in a physical location that a customer visits as part of the transaction, such as in a "brick and mortar" store, or may be virtual in e-commerce environments, such as online retailers receiving communications from customers over a network such as the Internet. In instances where the point of sale may be virtual, the computing device operated by the user to initiate the transaction or the computing system that receives data as a result of the transaction may be considered the point of sale, as applicable. The point of sale may typically support multiple ways of receiving electronic payment data from a consumer, such as via the reading of a magnetic strip or receiving of data from an integrated circuit payment card, or through receipt of a transmission via a contactless communication protocol (e.g., near field communication) from a computing device.

Conveyance of Transactional Data Using Contactless Communication

Figure 1:
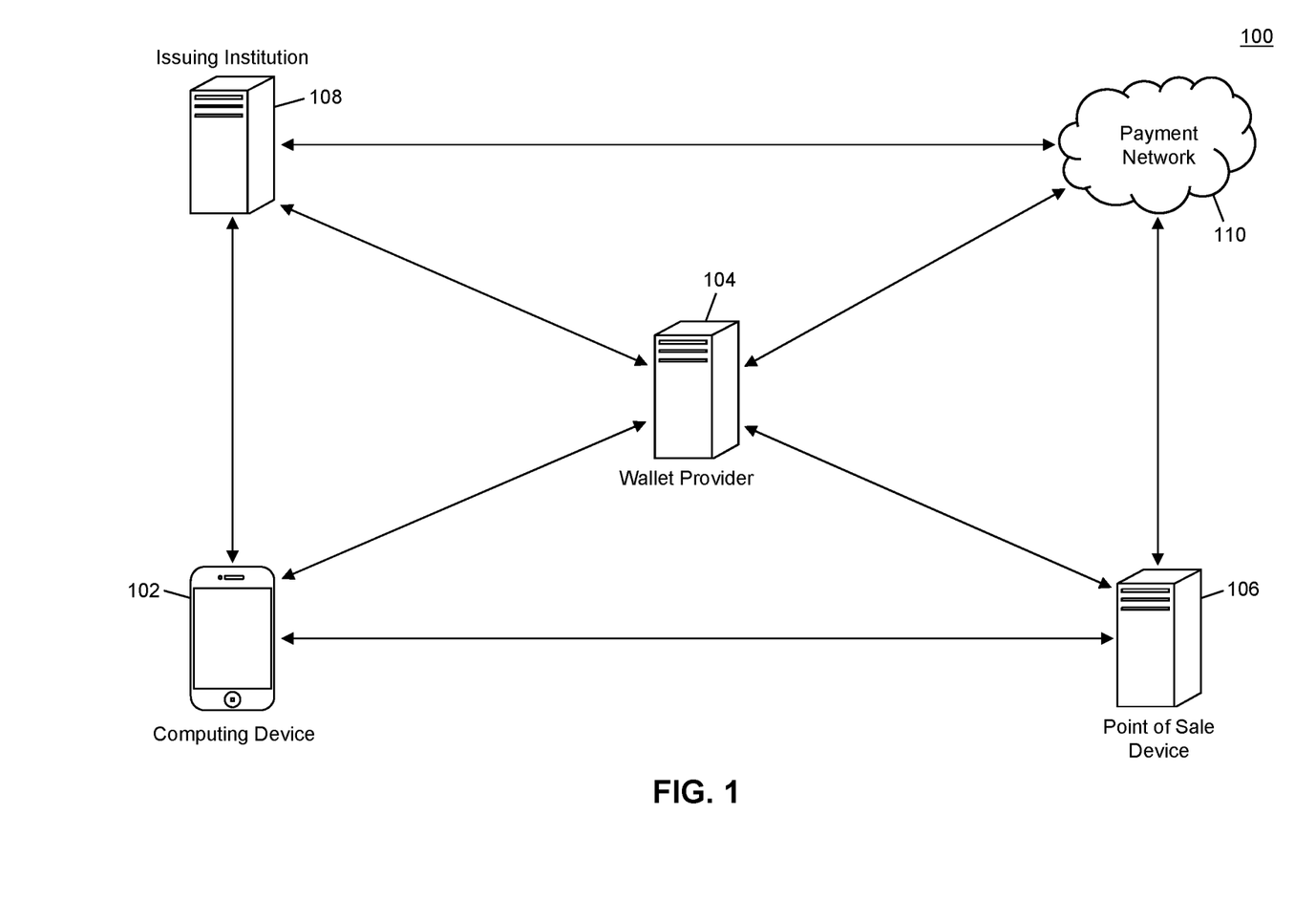
FIG. 1 is a block diagram illustrating a high level system architecture for conveying transactional data using contactless communication in accordance with exemplary embodiments.

FIG. 1 illustrates a system 100 for the conveyance of transactional data that is formatted for exchange via a machine-readable code using a contactless communication method as an alternative at the time of conveyance.

The system 102 may include a computing device 102. The computing device 102, discussed in more detail below, may be a user device configured for conveying payment credentials or other transaction data to a point of sale device 106 as part of an electronic payment transaction. The computing device 102 may be any type of computing device that is specifically configured to perform the functions as discussed herein, such as a desktop computer, laptop computer, notebook computer, laptop computer, cellular phone, smart phone, smart television, smart watch, wearable computing device, etc. The point of sale device 106 may be any type of point of sale that is configured to perform the functions discussed herein, including the receipt of electronically transmitted data messages using one or more contactless communication methods. In some cases, the point of sale device 106 may be unable to read or otherwise receive a machine-readable code, such as a quick response (QR) code, displayed by the computing device 102.

In the system 100, a consumer (e.g., user of the computing device 102) may be interested in conducting a payment transaction with a one-time number that is funded via a transaction account not issued or managed by a wallet provider 104 that is configured to process one-time number transactions as a payment service provider. The consumer may use the computing device 102 to obtain a one-time number that is mapped to a desired transaction account, to enable the desired transaction account to be used to fund a payment transaction that is processed via the one-time number. As used herein, "one-time number" may refer to a number or any other type of data that may be used for a single transaction that includes data suitable for use in performing the functions discussed herein. For instance, an alphanumeric value or other type of data may be used as an alternative to the one-time number. As discussed herein, a one-time number may be encoded in a machine-readable code that is displayed by the computing device 102 for use in conveyance thereof. The machine-readable code may be any type of code suitable for encoding the one-time number, such as a bar code or a quick response (QR) code. The one-time number may include at least an identification value, where any other data included in the one-time number may be referred to herein as "remaining value." In one embodiment, the one-time number may be an 18 digit number, where the first two digits may be the identification value, and where the other 16 digits may be the remaining value. Additional information regarding the use of one-time numbers in electronic payment transactions may be found in U.S. patent application Ser. No. 15/793,237, entitled "Method and System for Conveyance of Machine Readable Code Data via Payment Network," filed on Oct. 25, 2017, and U.S. patent application Ser. No. 15/878,571, entitled "Method and System for Barcode Enabled Payments," filed on Jan. 24, 2018, each of which are herein incorporated by reference in their entirety.

The system 100 may include an issuing institution 108. The issuing institution 108 may be a financial institution, such as an issuing bank, or other entity configured to issue transaction accounts for use in funding electronic payment transactions. The issuing institution 108 may issue a transaction account to the consumer that may be used in electronic payment transactions. As part of the issuing of the transaction account, the issuing institution 108 may provision payment credentials associated with the transaction account to the computing device 104 using a suitable method. The payment credentials may include a transaction account number or a tokenized version of a transaction account number and any other data necessary for the funding of an electronic payment transaction by the corresponding transaction account, such as may include a name, expiration date, security code, transaction counter, payment cryptogram, etc. The payment credentials may be stored in the computing device 102 using any suitable method, such as in a secure element or other secured data storage. In some cases, the computing device 102 may include an electronic wallet application program associated with the issuing institution 108 for the receipt and storage of the payment credentials.

Prior to the conducting of the one-time number transaction, the consumer may use the computing device 102 to request a one-time number from the wallet provider 104. The computing device 102 may electronically transmit a transaction request to the wallet provider 104 using a suitable communication network and method. In some cases, the transaction request may be submitted through an electronic wallet application program or an application programming interface (API) associated with the wallet provider 104. The wallet provider 104 may then return the one-time number to the computing device 102 for storage therein. When the consumer wants to use the one-time number for a payment transaction, the consumer may input an instruction to the computing device 102, which may instruct an application program (e.g., associated with the wallet provider 104) to generate a machine-readable code, such as a QR code, that is encoded with the one-time number or any other transactional data that may be suitable for an electronic payment transaction. Such data may include, for instance, other payment credentials, cryptograms, a transaction amount, geographic location, loyalty data, offer data, reward data, etc.

The computing device 102 may display the QR code or other machine-readable code for reading by the point of sale device 106. In embodiments where the point of sale device 106 is unable to read and/or decode QR codes or other machine-readable codes, the computing device 102 may be configured to generate a contactless data message for electronic transmission to the point of sale device 106 via alternative means. The computing device 102 may receive a trigger notification. In some embodiments, the trigger notification may be input received via an input device interfaced with the computing device 102. For example, the computing device 102 may have a capacitive touch screen that the consumer may interact with to instruct the computing device 102 to use a contactless communication method as an alternative to the QR code. In another example, the point of sale device 102 may electronically transmit a signal, such as a broadcast message, using a contactless communication protocol, which may be detected by the computing device 102. In such an example, the detected signal of the point of sale device 102 may be the trigger notification.

Upon receipt of the trigger notification, the computing device 102 may be configured to generate a contactless data message. The contactless data message may include the transactional data that was included in the QR code or other machine-readable code, such as the one-time number. In some cases, the contactless data message may include additional data, such as to indicate that its transmission is an alternative to the QR code or to instruct the point of sale device 106 for processing accordingly. The contactless data message may be formatted according to one or more standards governing the exchange of data messages using contactless communication protocols. In some instances, the contactless data message may be formatted using the same standard(s) used in the conveyance of traditional payment credentials using an applicable contactless communication protocol. In some cases, the contactless data message may be formatted according to standards application to traditional transaction messages, such as the International Organization of Standardization's ISO 8583 or ISO 20022 standards. In some embodiments, the contactless data message may be generated by a separate application program of the computing device 102, which may be different from the application program used to generate and/or display the QR code.

The computing device 102 may electronically transmit the contactless data message to the point of sale device 106 using a suitable contactless communication protocol, such as near field communication. In some embodiments, the computing device 102 may be configured to remove the QR code or other machine-readable code from display when electronically transmitting the contactless data message. In some cases, removal of the QR code may be based on the trigger notification. In some instances, removal of the QR code may be based on user preferences, such as may be set by the user in an application program (e.g., used to display the QR code or to generate the contactless data message). In some embodiments, the computing device 102 may be configured to always utilize contactless communication as an alternative to a QR code if available (e.g., if a trigger notification is received). In other embodiments, the computing device 102 may decide between a QR code and contactless data message based on user preferences, such as may be stored in a memory of the computing device 102 and/or in program code for an application program of the computing device 102.

The point of sale device 106 may receive the contactless data message and identify the one-time number or other transactional data included therein. The point of sale device 106 may then initiate an electronic transaction using the one-time number or other transactional data. The electronic transaction may then be processed, such as using the payment network 110 (e.g., for a traditional electronic payment transaction) or the wallet provider 104 (e.g., for the processing of a one-time number). In some cases, the one-time number may be mapped to a primary account number of a traditional transaction account. In such cases, the wallet provider 104 may identify the mapped primary account number for a one-time number submitted by the point of sale device 106, which may then be forwarded on to the payment network 110 in a transaction message for processing as a standard electronic payment transaction. As part of the processing, the issuing institution 108 may be contacted by the payment network 110 for authorization of use of the related transaction account for funding of the electronic payment transaction.

The methods and systems discussed herein enables a computing device 102 to electronically transmit transactional data, such as a one-time number, to a point of sale device 106 as an alternative to the display of a machine-readable code, such as a QR code. This can be beneficial in cases where a point of sale device 106 may be able to receive contactless data messages, but may be unable to read and/or decode QR codes or other displayed machine-readable codes. As a result, the number of point of sale devices 106 that may accept a one-time number may be drastically increased due to the use of contactless communication by the computing device 102. The new technological implementation of the computing device 102, enabling a contactless data message to be generated rather than a QR code used, may also facilitate the wallet provider 104 in having wider acceptance of the one-time number or other payment credentials. As a result, the computing device 102, configured according to the methods and systems discussed herein, may result in a significant increase in potential transactions for wallet providers 104, point of sale devices 106, and, by extension, issuing institutions 108.

Computing Device

Figure 2:
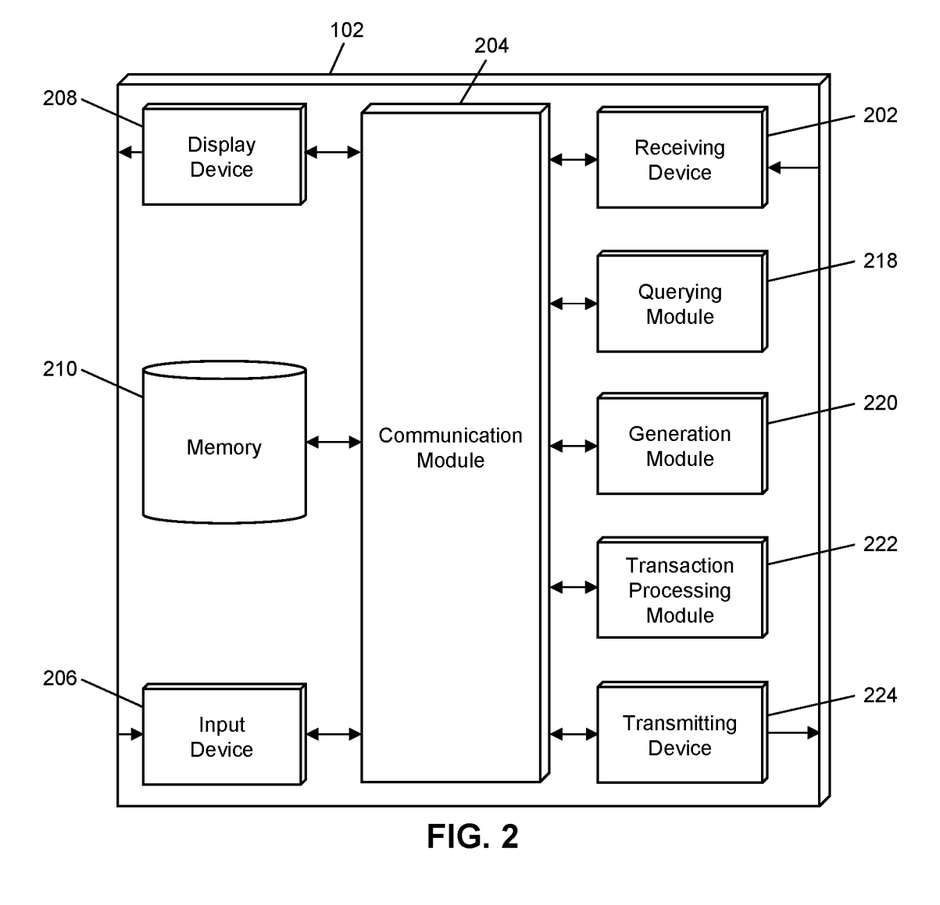
FIG. 2 is a block diagram illustrating the computing device of the system of FIG. 1 for conveying machine-readable code data using a contactless communication method in accordance with exemplary embodiments.

FIG. 2 illustrates an embodiment of a computing device 102 in the system 100. It will be apparent to persons having skill in the relevant art that the embodiment of the computing device 102 illustrated in FIG. 2 is provided as illustration only and may not be exhaustive to all possible configurations of the computing device 102 suitable for performing the functions as discussed herein. For example, the computer system 500 illustrated in FIG. 5 and discussed in more detail below may be a suitable configuration of the computing device 102.

The computing device 102 may include a receiving device 202. The receiving device 202 may be configured to receive data over one or more networks via one or more network protocols. In some instances, the receiving device 202 may be configured to receive data from wallet providers 104, point of sale devices 106, issuing institutions 108, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted wallet providers 104, such as may be superimposed or otherwise encoded with one-time numbers or other transactional data. The receiving device 202 may also be configured to receive data signals electronically transmitted by point of sale devices 106, such as may be superimposed or otherwise encoded with transaction data or requests for transaction data, which may be transmitted via a contactless communication protocol. For example, the point of sale device 106 may electronically transmit a transaction amount or other data to be used by the computing device 102 in generation of the contactless data message discussed herein. In some cases, signals received from the point of sale device 106 may be trigger notifications for the computing device 102. The receiving device 202 may also be configured to receive data signals electronically transmitted by issuing institutions 108, which may be superimposed or otherwise encoded with payment credentials or other account data, which may be used in the generation of a contactless data message, identification of a one-time number, etc.

The computing device 102 may also include a communication module 204. The communication module 204 may be configured to transmit data between modules, engines, databases, memories, and other components of the computing device 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the computing device 102 and external components of the computing device 102, such as externally connected databases, display devices, input devices, etc. The computing device 102 may also include a processing device. The processing device may be configured to perform the functions of the computing device 102 discussed herein as will be apparent to persons having skill in the relevant art. In some embodiments, the processing device may include and/or be comprised of a plurality of engines and/or modules specially configured to perform one or more functions of the processing device, such as a querying module 218, generation module 220, transaction processing module 222, etc. As used herein, the term "module" may be software or hardware particularly programmed to receive an input, perform one or more processes using the input, and provides an output. The input, output, and processes performed by various modules will be apparent to one skilled in the art based upon the present disclosure.

The computing device 102 may also include or be otherwise interfaced with one or more input devices 206. The input devices 206 may be internal to the computing device 102 or external to the computing device 102 and connected thereto via one or more connections (e.g., wired or wireless) for the transmission of data to and/or from. The input devices 206 may be configured to receive input from a user of the computing device 102, which may be provided to another module or engine of the computing device 102 (e.g., via the communication module 204) for processing accordingly. Input devices 206 may include any type of input device suitable for receiving input for the performing of the functions discussed herein, such as a keyboard, mouse, click wheel, scroll wheel, microphone, touch screen, track pad, camera, optical imager, etc. The input device 206 may be configured to, for example, receive a trigger notification from the user to have a contactless data message generated as an alternative to a displayed QR code.

The computing device 102 may also include or be otherwise interfaced with a display device 208. The display device 208 may be internal to the computing device 102 or external to the computing device 102 and connected thereto via one or more connections (e.g., wired or wireless) for the transmission of data to and/or from. The display device 208 may be configured to display data to a user of the computing device 102. The display device 208 may be any type of display suitable for displaying data as part of the functions discussed herein, such as a liquid crystal display, light emitting diode display, thin film transistor display, capacitive touch display, cathode ray tube display, light projection display, etc. In some instances, the computing device 102 may include multiple display devices 208. The display device 208 may be configured to, for example, display a QR code or other machine-readable code that is encoded with a one-time number or other transactional data.

The computing device 102 may also include a memory 210. The memory 210 may be configured to store data for use by the computing device 102 in performing the functions discussed herein, such as public and private keys, symmetric keys, etc. The memory 210 may be configured to store data using suitable data formatting methods and schema and may be any suitable type of memory, such as read-only memory, random access memory, etc. The memory 210 may include, for example, encryption keys and algorithms, communication protocols and standards, data formatting standards and protocols, program code for modules and application programs of the processing device, and other data that may be suitable for use by the computing device 102 in the performance of the functions disclosed herein as will be apparent to persons having skill in the relevant art. In some embodiments, the memory 210 may be comprised of or may otherwise include a relational database that utilizes structured query language for the storage, identification, modifying, updating, accessing, etc. of structured data sets stored therein.

The memory 210 may be configured to store, for example, one-time numbers, payment credentials, or other transactional data provisioned to the computing device 102, such as by the wallet provider 104 and/or issuing institution 108. The memory 210 may also be configured to store program code for one or more application programs. For instance, the memory 210 may store program code for a first application program configured to generate and display a QR code, as well as program code for a second application program configured to generate a contactless data message based on the QR code for contactless transmission to a point of sale device 106. The memory 210 may also be configured to store (e.g., in the program code of the appropriate application program or separately) data for use by the computing device 102 in formatting contactless data messages, such as standard information, formatting rules, etc. The memory 210 may also be configured to store user preferences, such as for the display of QR codes, priority of contactless data messages over QR codes, etc.

The computing device 102 may include a querying module 218. The querying module 218 may be configured to execute queries on databases to identify information. The querying module 218 may receive one or more data values or query strings, and may execute a query string based thereon on an indicated database, such as the memory 210, to identify information stored therein. The querying module 218 may then output the identified information to an appropriate engine or module of the computing device 102 as necessary. The querying module 218 may, for example, execute a query on the memory 210 to identify formatting rules for a contactless data message and transactional data for use in generating a new contactless data message that includes a one-time number or other transactional data.

The computing device 102 may also include a generation module 220. The generation module 220 may be configured to generate data for use by the computing device 102 in performing the functions discussed herein. The generation module 220 may receive instructions as input, may generate data based on the instructions, and may output the generated data to one or more modules of the computing device 102. For example, the generation module 220 may be configured to generate one-time numbers, where each one-time number may include an identification value associated with or otherwise referencing the computing device 102 for use in routing by the wallet provider 104 or other entity. The generation module 220 may also be configured to generate machine-readable codes, such as QR codes, which may be encoded with a one-time number or other transactional data. The generation module 220 may be further configured to generate contactless data messages that include at least a one-time number or other transactional data that is included in a QR code, and may also include additional data.

The computing device 102 may also include a transaction processing module 222. The transaction processing module 222 may be configured to perform functions associated with the processing of transactions as part of the computing device 102 as discussed herein. For example, the transaction processing module 222 may be configured to initiate payment transactions for the funding of one-time number transactions using traditional transaction accounts, perform routing of authorization requests and responses, etc. The transaction processing module 222 may also, for instance, be configured to generate payment cryptograms or other data for use in payment credentials that are electronically transmitted using the methods discussed herein.

The computing device 102 may also include a transmitting device 224. The transmitting device 224 may be configured to transmit data over one or more networks via one or more network protocols. In some instances, the transmitting device 224 may be configured to transmit data to wallet providers 104, point of sale devices 106, issuing institutions 108, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to wallet providers 104, which may be superimposed or otherwise encoded with requests for one-time numbers, which may include a primary account number or other data for use in mapping a transaction account to a one-time number. The transmitting device 224 may also be configured to electronically transmit data signals to point of sale devices 106, which may be superimposed or otherwise encoded with contactless data messages that include one-time numbers or other transactional data, and may be transmitted using a suitable contactless communication protocol and formatted according to standards applicable thereto. The transmitting device 224 may also be configured to electronically transmit data signals to issuing institutions 108, such as to request the provisioning of payment credentials or for other interactions with the issuing institution 108 regarding a transaction account issued thereby.

Process for Conveyance of Transactional Data Via Contactless Communication

Figure 3:
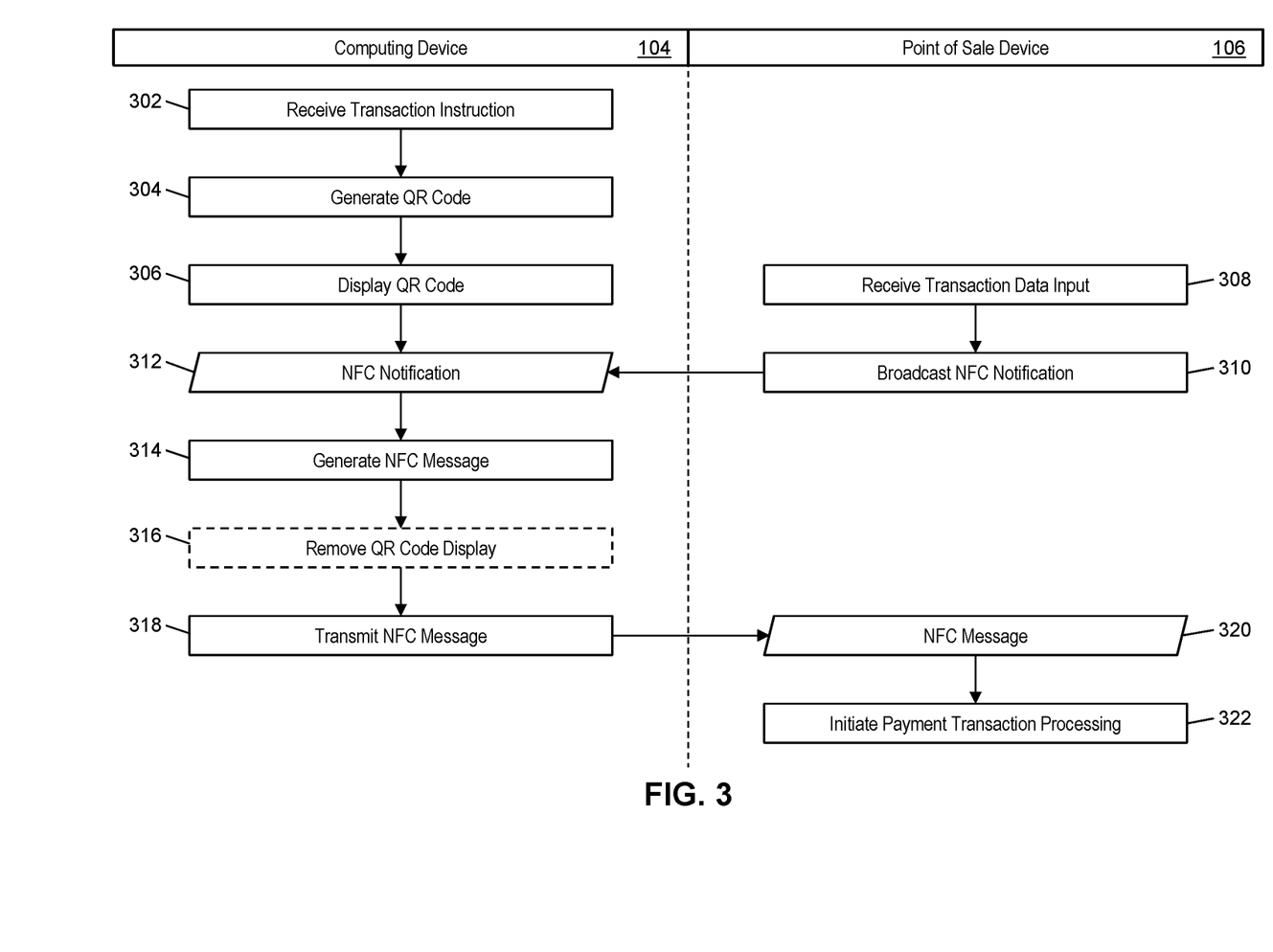
FIG. 3 is a flow diagram illustrating a process for the conveyance of transactional data using contactless communication in the system of FIG. 1 in accordance with exemplary embodiments.

FIG. 3 illustrates an example process executed in the system 100 of FIG. 1 for the conveyance of transactional data using contactless communication as an alternative to a displayed machine-readable code by the computing device 102.

In step 302, the input device 206 of the computing device 102 may receive an instruction from a user of the computing device 102 to initiate an electronic transaction funded via a one-time number. In step 304, the generation module 220 may generate a QR code that is encoded with the one-time number, which may also be encoded with any other additional transactional data that may be used in an electronic transaction. In step 306, the display device 206 interfaced with the computing device 102 may display the generated QR code thereon.

In step 308, the point of sale device 106 may receive input of transaction data, such as by an employee of the merchant that includes the point of sale device 106 or the user of the computing device 102, such as at a self-service kiosk. The transaction data may include any data that may be used in the processing of a payment transaction, such as a transaction amount, product identifiers, product data, reward data, offer data, loyalty data, merchant data, acquirer data, geographic location, currency type, etc. In step 310, the point of sale device 106 may broadcast a data signal use near field communication (NFC) or other type of contactless communication method, such as the ISO 14443 Type A and Type B polling. The broadcast data signal may include payment network data, or may not include any data unique to the electronic transaction (e.g., may be a notification that the point of sale device 106 is capable of receiving contactless data messages), or attempt to select a payment application following the EMV Co standards and the proximity payment system environment (PPSE) application.

In step 312, the receiving device 202 of the computing device 102 may receive the notification broadcasted by the point of sale device 106 using NFC. This notification is commonly used to identify which NFC coding being offered by the terminal, e.g., NFC-A, -B or -C, and serves to agree a communications protocol and payment application via NFC. In step 314, the generation module 220 may generate a contactless data message that includes the one-time number and/or other transactional data included in the QR code. The contactless data message may be formatted according to one or more standards, such as the creation of payment track data where the one-time code is embedded compatible with the target payment network (e.g., Mastercard contactless magnetic stripe protocol) or other network equivalents, such as the EMV Co standards. In some cases, the NFC notification may specify the standards, either directly (e.g., explicitly stated in the notification) or indirectly (e.g., based on the formatting of the NFC notification itself or communication method used). In some embodiments, the process may also include step 316, where the computing device 102 may be configured to remove the QR code from display on the display device 208. In some instances, the removal of the QR code may be optional, such as may be based on preferences of the user of the computing device 102.

In step 318, the transmitting device 224 of the computing device 102 may electronically transmit the generated contactless data message to the point of sale device 102 using a suitable contactless communication protocol. In some instances, the contactless communication protocol used in the transmission of the contactless data message may be the same protocol used in the broadcasting of the NFC notification from the point of sale device 106, in step 310. In step 320, the point of sale device may receive the contactless data message via NFC (e.g., or other suitable protocol). In step 322, the point of sale device 106 may initiate an electronic payment transaction for processing, such as by the payment network 110 and issuing institution 108 using traditional methods, where the one-time number or other transactional data that was included in the contactless data message may be used by the point of sale device 106 for the processing of the transaction.

Exemplary Method for Contactless Conveyance of Transactional Data

Figure 4:
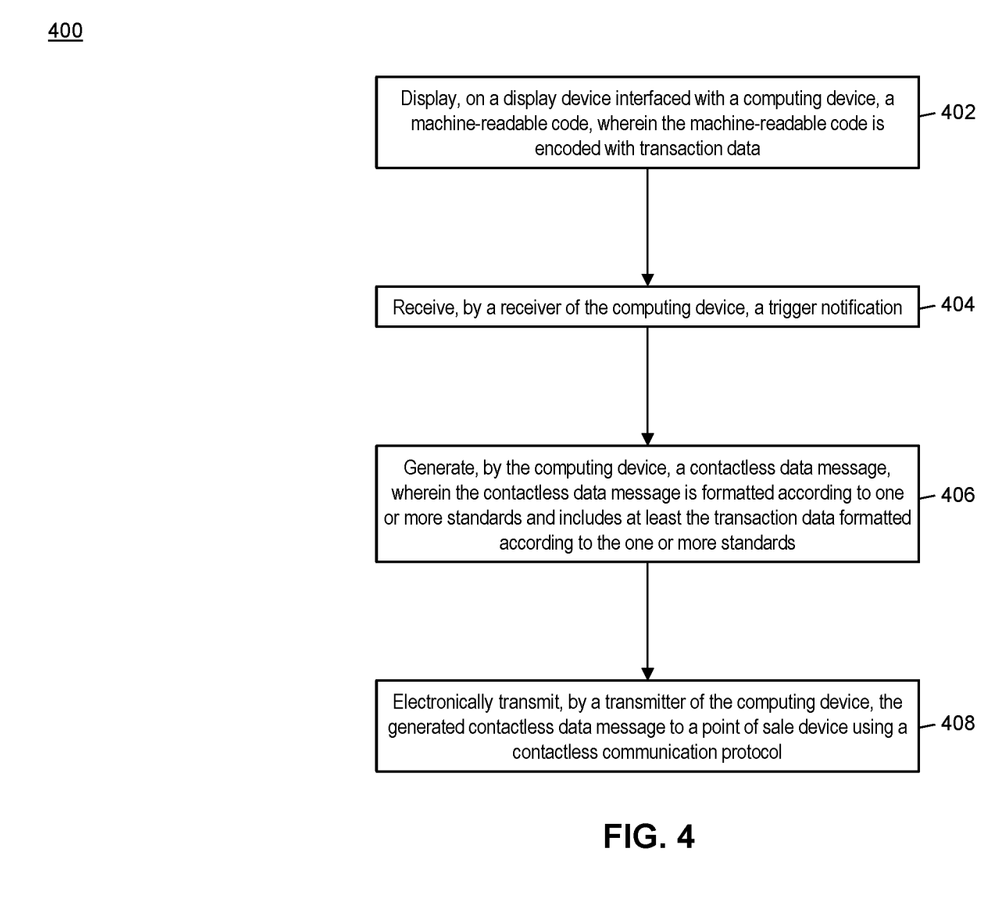
FIG. 4 is a flow chart illustrating an exemplary method for contactless conveyance of transactional data in accordance with exemplary embodiments.

FIG. 4 illustrates a method 400 for the contactless conveyance of transactional data using a suitable contactless communication method as an alternative to a displayed machine-readable code.

In step 402, a machine-readable code may be displayed on a display device (e.g., the display device 208) interfaced with a computing device (e.g., the computing device 102), wherein the machine-readable code is encoded with transaction data. In step 404, a trigger notification may be received by a receiver (e.g., the receiving device 202, input device 206, etc.) of the computing device.

In step 406, a contactless data message may be generated by the computing device (e.g., via the generation module 220 thereof), wherein the contactless data message is formatted according to one or more standards and includes at least the transaction data formatted according to the one or more standards. In step 408, the generated contactless data message may be electronically transmitted by a transmitter (e.g., the transmitting device 224) of the computing device to a point of sale device (e.g., the point of sale device 106) using a contactless communication protocol.

In one embodiment, the trigger notification may be received via an input device (e.g., the input device 206) interfaced with the computing device. In some embodiments, the trigger notification may be received from the point of sale device using the contactless communication protocol. In one embodiment, the machine-readable code may be displayed via a first application program executed by a processor of the computing device, and the contactless data message may be generated via a second application program executed by the processor of the computing device distinct from the first application program.

In some embodiments, the method 400 may further include removing, by the computing device, the machine-readable code from display on the display device prior to electronic transmission of the generated contactless data message. A suitable graphic, such as the QR code morphing into a symbol for a radio or NFC signal, can be used to alert the user that the NFC communication channel is being utilized over the QR display. In a further embodiment, the machine-readable code may be removed from display only if mandated by a rule stored in a memory of the computing device. In one embodiment, the transaction data may include at least a one-time value. In some embodiments, the transaction data may include at least payment credentials associated with a transaction account.

Computer System Architecture

Figure 5:
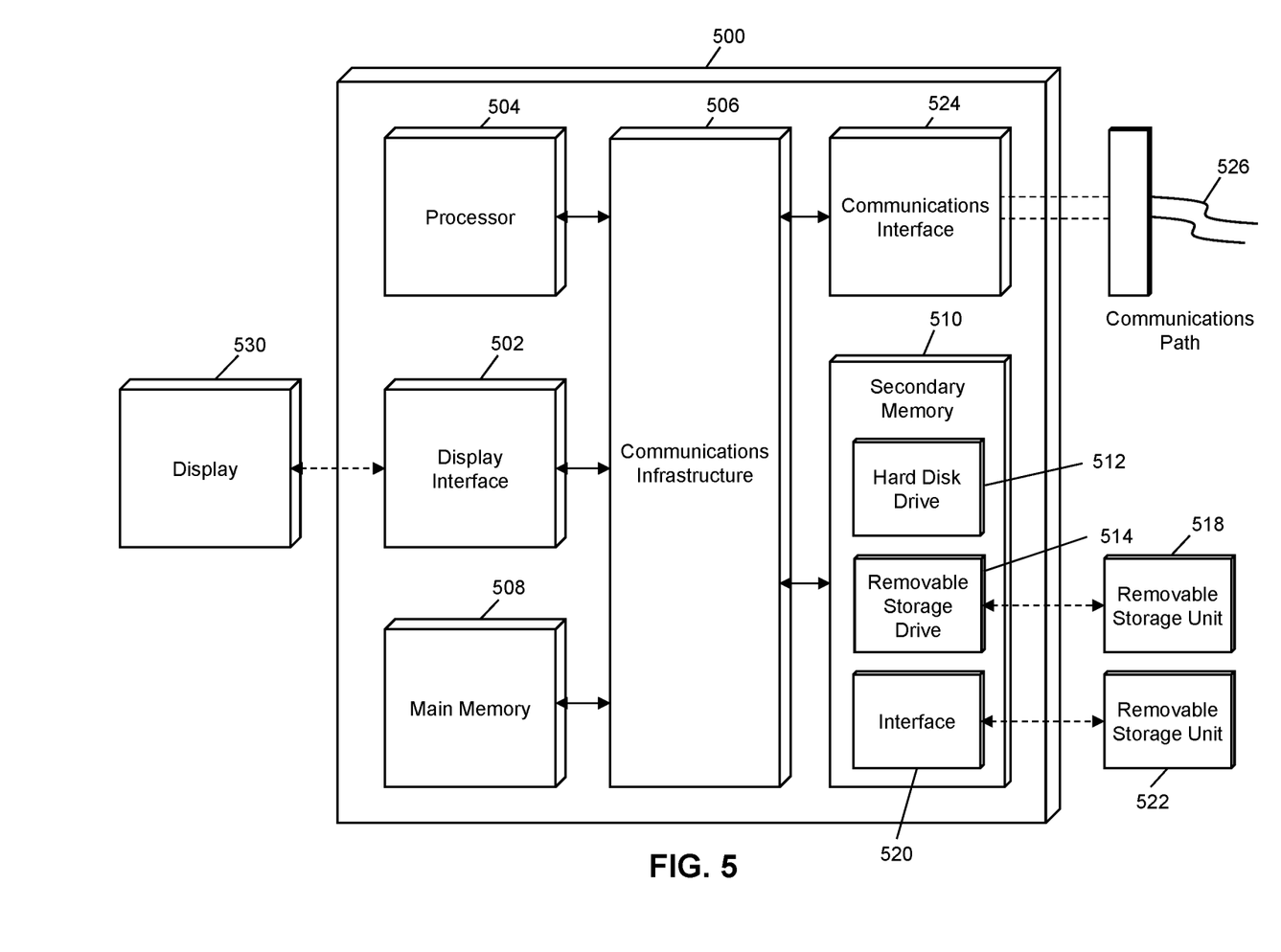
FIG. 5 is a block diagram illustrating a computer system architecture in accordance with exemplary embodiments.

FIG. 5 illustrates a computer system 500 in which embodiments of the present disclosure, or portions thereof, may be implemented as computer-readable code. For example, the processing server 102 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for contactless conveyance of transactional data. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for contactless conveyance of transactional data, comprising:

displaying, on a display device interfaced with a mobile computing device, a machine-readable code, wherein the machine-readable code is encoded with transaction data;

in response to a point of sale (POS) device being unable to read and/or decode the machine-readable code displayed on the display device, receiving, by a receiver of the mobile computing device, a trigger notification;

in response to receiving the trigger notification, generating, by the mobile computing device, a contactless data message, wherein the contactless data message is formatted according to one or more standards and includes at least (i) the transaction data formatted according to the one or more standards, and (ii) additional data indicating that the contactless data message is an alternative to the machine-readable code; and electronically transmitting, by a transmitter of the mobile computing device, the generated contactless data message to the POS device using a contactless communication protocol.

2. The method of claim 1, wherein the trigger notification is received via an input device interfaced with the mobile computing device.

3. The method of claim 1, wherein the trigger notification is received from the point of sale device using the contactless communication protocol.

4. The method of claim 1, further comprising:

removing, by the mobile computing device, the machine-readable code from display on the display device prior to electronic transmission of the generated contactless data message.

5. The method of claim 4, wherein the machine-readable code is removed from display only if mandated by a rule stored in a memory of the mobile computing device.

6. The method of claim 1, wherein the machine-readable code is displayed via a first application program executed by a processor of the mobile computing device, and the contactless data message is generated via a second application program executed by the processor of the mobile computing device distinct from the first application program.

7. The method of claim 1, wherein the transaction data included in the machine-readable code and the contactless data message transmitted from the mobile computing device to the POS device includes at least a one-time value.

8. The method of claim 1, the transaction data includes at least payment credentials associated with a transaction account.

9. A system for contactless conveyance of transactional data, comprising:

a display device interfaced with a mobile computing device configured to display a machine-readable code, wherein the machine-readable code is encoded with transaction data;

a receiver of the mobile computing device configured to receive, in response to a point of sale (POS) device being unable to read and/or decode the machine-readable code displayed on the display device, a trigger notification;

the mobile computing device configured to generate, in response to receiving the trigger notification, a contactless data message, wherein the contactless data message is formatted according to one or more standards and includes at least (i) the transaction data formatted according to the one or more standards, and (ii) additional data indicating that the contactless data message is an alternative to the machine-readable code; and a transmitter of the mobile computing device configured to electronically transmit the generated contactless data message to the POS device using a contactless communication protocol.

10. The system of claim 9, wherein the trigger notification is received via an input device interfaced with the mobile computing device.

11. The system of claim 9, wherein the trigger notification is received from the point of sale device using the contactless communication protocol.

12. The system of claim 9, wherein the mobile computing device is further configured to remove the machine-readable code from display on the display device prior to electronic transmission of the generated contactless data message.

13. The system of claim 12, wherein the machine-readable code is removed from display only if mandated by a rule stored in a memory of the mobile computing device.

14. The system of claim 9, wherein the machine-readable code is displayed via a first application program executed by a processor of the mobile computing device, and the contactless data message is generated via a second application program executed by the processor of the mobile computing device distinct from the first application program.

15. The system of claim 9, wherein the transaction data included in the machine-readable code and the contactless data message transmitted from the mobile computing device to the POS device includes at least a one-time value.

16. The system of claim 9, the transaction data includes at least payment credentials associated with a transaction account.

17. The system of claim 9, wherein the transaction data includes at least a one-time value, the system further comprising:

an electronic wallet application program or application programming interface (API), installed on the mobile computing device, configured to transmit, to a wallet provider, a request for a one-time number, and wherein the computing device is further configured to receive the one-time value from the wallet provider.

18. The system according to claim 17, wherein the mobile computing device is configured to generate, in response to receiving the one-time value from the wallet provider, the machine-readable code.

19. The method of claim 1, wherein the transaction data includes at least a one-time value, the method further comprising:

transmitting, via an electronic wallet application program or an application programming interface (API) of the mobile computing device, to a wallet provider, a request for the one-time number; and receiving, by the mobile computing device, the one-time value from the wallet provider.

20. The method of claim 19, further comprising:

in response to receiving the one-time value from the wallet provider, generating, by the mobile computing device, the machine-readable code.

* * * * *